March 1, 1960 R. C. CUMMING 2,927,280

METHOD AND APPARATUS FOR TRANSLATING THE FREQUENCY OF A SIGNAL

Filed April 9, 1956 2 Sheets-Sheet 1

INVENTOR.
RAYMOND C. CUMMING
BY Lippincott & Smith
ATTORNEYS

March 1, 1960 R. C. CUMMING 2,927,280

METHOD AND APPARATUS FOR TRANSLATING THE FREQUENCY OF A SIGNAL

Filed April 9, 1956 2 Sheets-Sheet 2

INVENTOR.
RAYMOND C. CUMMING
BY Lippincott & Smith
ATTORNEYS 2,927,280
Patented Mar. 1, 1960

2,927,280

METHOD AND APPARATUS FOR TRANSLATING THE FREQUENCY OF A SIGNAL

Raymond Charles Cumming, Palo Alto, Calif., assignor to Research Corporation, New York, N.Y., a corporation of New York Application April 9, 1956, Serial No. 577,084
6 Claims. (Cl. 331—42)

This invention relates to a method and apparatus for combining two signals to produce a third signal, and more particularly, to a method and apparatus for translating the frequency of a signal.

In the prior art, frequency translation is accomplished by sinusoidal modulation of an input signal to generate intermodulation frequency components or sidebands. One of such intermodulation frequency components is then selected by means of a filter capable of passing the desired frequency component and rejecting all other components to give the desired frequency translation effect.

At very high frequencies, for example, an often-used system of obtaining frequency translation requires the application of sinusoidal modulation to the electron accelerating voltage in a klystron or a traveling-wave tube. This modulation of the electron accelerating voltage causes a modulation of the electron transit time, and results in a transit-time-modulated output signal. The frequency spectrum of such a sinusoidally transit-time-modulated signal consists of many frequency components. Letting $f$ equal the input frequency and $f_m$ equal the modulation frequency, the frequencies present in such a spectrum are given by $f \pm nf_m$, where $n$ equals 1, 2, 3, etc. The relative amplitudes of these frequency components are given by Bessel functions of the first kind.

In such systems, in order to secure a signal which is translated from the original signal, it is necessary to select a single one of the aforementioned frequency components. Accordingly, a filter which will discriminate between such components is necessary. Such a filter will commonly select either the component $f+f_m$ or the component $f-f_m$ to give the desired translation, these components having the maximum amplitude. The maximum possible relative amplitude of such first order intermodulation frequency components in either of such cases is $J_1$ (1.84), where $J_1$ is the first order Bessel function of the first kind. It follows that the maximum relative power in this component is $[J_1(1.84)]^2$, or approximately 0.34. The foregoing, of course, are relative figures, the reference being to the output obtainable from the same tube with the same signal power input operated as an ordinary unmodulated device.

Several deficiencies are apparent in frequency translating systems using sinusoidal modulation, such as the systems described hereinabove. First, a filter must be used to select the desired intermodulation frequency component and reject the unwanted components. This filter makes the systems inherently narrow-band, operating over only a relatively limited range of input and modulation frequencies. Secondly, the sinusoidal modulation system exhibits relatively low values of conversion gain and efficiency. In the above examples, the conversion gain and efficiency are only 34% of the figures obtainable from the same tube operated in an ordinary unmodulated fashion.

It is an object of the invention herein to overcome the deficiencies of prior art systems and provide a method and apparatus for the translation of a signal which will permit efficiencies approaching 100% of the efficiency of the same device operating in an unmodulated fashion. Another object of the invention is to provide a frequency translating system wherein the theoretical conversion gain of the sawtooth modulated device approaches 100% of the gain of the same device operating in an unmodulated fashion. Another object of the invention is to provide a method and apparatus for combining frequencies which produces little or no power output in undesired intermodulation frequency components relative to the power in the desired component, and hence which does not require a filter to select the desired intermodulation frequency component.

It is also an object of the invention to provide a method and apparatus for the combining of two or more signal frequencies which is inherently wide-band both with respect to the modulating and the modulated frequencies, that is, which allows an input wave having a broad frequency spectrum which may, for example, have previously been modulated in any known method, to be modulated by a second signal, which may similarly have a broad frequency spectrum.

Various other objects and advantages of the invention herein will occur to those familiar with the art from the figures and the description herein.

In the method of frequency translation of the invention herein, an input signal is transit-time (or time-delay) modulated with a linear sawtooth waveform, or with a waveform which approximates a linear sawtooth waveform. For example, in a klystron or a traveling-wave tube, modulation of the electron-accelerating voltage by a sawtooth waveform will produce sawtooth transit-time modulation. In such tubes the linear increase in accelerating voltage causes electron bunches which leave the input terminal at equal intervals to arrive at the output terminal with smaller, but uniform, spacing between bunches due to the increase in accelerating voltage with respect to successive bunches. When the group of electron bunches having their spacing altered by a particular cycle of the sawtooth modulating voltage is in phase coherence with each of the other groups of bunches a uniform increase or decrease in the original input frequency is obtained with a power output very nearly equal to the unmodulated power output. Such phase coherence will be obtained by using a proper magnitude of sawtooth modulating voltage to effect the necessary change in transit time. Ordinarily, the effect of the sawtooth return time on phase coherence is negligible, but in any case the magnitude of the modulating voltage may be adjusted to compensate for this effect also. The phase coherence between successive groups of electron bunches is relatively insensitive to changes in the input frequency, and the invention is accordingly broad band with respect to such frequencies. The invention is also broad band with respect to the modulating frequencies. If desired, the amplitude of the modulating sawtooth waveform may easily be made dependent upon the output frequency to retain phase coherence regardless of such output frequency. Such amplitude correction or other correction of the modulating voltage may not be necessary in many cases, as for example, where the output frequencies are not too widely spaced. Any time-delay modulation device which is capable of producing the peak-to-peak modulation of one period or more at the desired output frequency may be employed in the invention, although in the specification herein reference will be made mainly to klystrons and traveling-wave tubes to more clearly illustrate the method and apparatus of the invention. The invention is, of course, not to be limited by such references.

The invention may be better understood by reference to the figures of the drawings, wherein.

Figure 1:
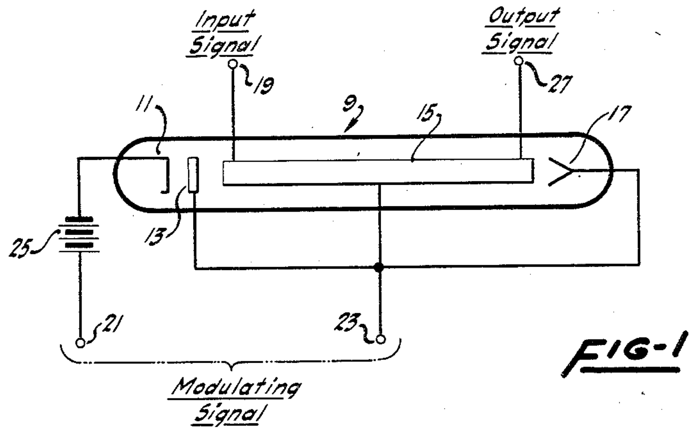
Fig. 1 is a diagrammatic representation of a klystron or a traveling-wave tube with connections for applying a modulation voltage thereto.

In Fig. 1, a diagrammatic representation of a klystron or a traveling-wave tube 9 is shown. A cathode 11, an anode 13, an electron travel element 15 and a collector 17 are shown. Electron travel element 15 may be, for example, a traveling-wave tube helix or a klystron drift space. An input signal is applied via terminal 19. A modulating signal applied to terminals 21 and 23 causes a modulating voltage to be superimposed on the D.C. voltage furnished by a battery 25. The result is a modulation of the transit time of the electron bunches in the electron travel element 15. The variation in electron bunch travel time caused by the modulating signal results in a transit-time-modulated output signal appearing on terminal 27. Anode 13, electron travel element 15 and collector 17 are all shown connected. This, of coursse, is only one of the possible circuits. Other such circuits may involve, for example, different voltages to each of the elements shown, or additional elements, such as additional anodes, etc., and appropriate circuitry. Such variations are well-known to the art.

Figure 2:
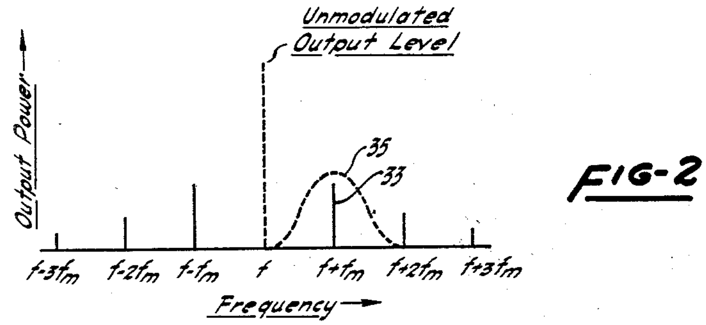
Fig. 2 is a graph showing the power spectrum of an output signal resulting from sinusoidal transit-time modulation in an apparatus such as depicted in Fig. 1.

Fig. 2 is a graph showing the power spectrum of an output signal appearing on terminal 27 of Fig. 1 when a sinusoidal modulating signal is being applied to terminals 21 and 23. The power level of each of the various component frequencies $f \pm nf_m$ produced by such modulation is shown. A dotted line representing the unmodulated output level is also shown. For the purposes of frequency translation, a particular sideband component, such as for example, $f+f_m$, shown at 33, must be selected, and in order to accomplish such selection the filter having a transmission characteristic such as curve 35 must be employed. It will be noted that the maximum output level obtainable by sinusoidal modulation is greatly reduced from the unmodulated output level. The actual level of such components, as already mentioned, is given by Bessel functions of the first kind, and on a relative basis is only 34% of the unmodulated output level.

Figure 3:
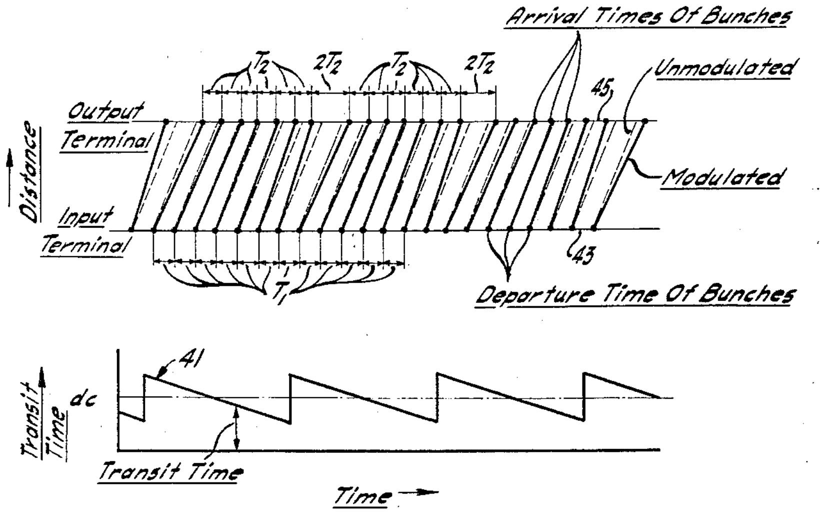
Fig. 3 is a chart showing the effect of a sawtooth modulation of the transit time on the electron bunches in the tube of Fig. 1 in producing positive translation of frequencies.

The effect of modulating with a signal having a sawtooth waveform is shown in Fig. 3. Curve 41 depicts the waveform of the transit-time which results from a sawtooth modulating voltage which is superimposed on a D.C. voltage. Since the modulating voltage is applied to the cathode, and negative voltages so applied increase acceleration, curve 41 may also be taken as substantially representing the voltage modulating waveform if the dot-dash line "D.C." be taken as the zero axis. The effect of this variation of transit time on the travel of electron bunches may be noted in the top portion of Fig. 3. The dots along input axis 43 represent the departure time of bunches of electrons. The ordinate of the top portion of Fig. 3 represents distance, and the arrival time of the electron bunches is depicted along output axis 45. In the absence of a modulating voltage, each electron bunch requires an equal amount of time as shown by the dashed lines to reach the output terminal, shown along axis 45. The time interval between each successive electron bunch in such an unmodulated condition is of course the same as the time interval between the bunches as they left the input terminal, as shown along axis 43. There is, accordingly, no change in the frequency.

Now, however, when the sawtooth modulating voltage is introduced as, for example, to terminals 21 and 23 of Fig. 1, the travel time of the electron bunches is varied in accordance with the particular voltage existing at the time of departure of each such electron bunch. This is depicted in Fig. 3 by the solid lines drawn between the input axis 43 and the output axis 45. The higher the voltage, the shorter the transit time, and the more rapidly the distance between the input terminal and output terminal is traversed. The transit time of the various bunches of electrons varies inversely as their velocity, and the velocity varies approximately as the square root of the total accelerating voltage, i.e., the algebraic sum of the constant component and the instantaneous value of the modulating component. The modulating component of voltage is normally small in comparison with the D.C. component. Calling the constant component of the accelerating voltage $E_0$, the total accelerating voltage can be expressed as $E=E_0(1\pm m)$, where $m$ is a small fraction representing the instantaneous proportional change in accelerating voltage. Because $m$ is very small, the approximations $$\sqrt{1\pm m}=1\pm m/2 \text{ and } \frac{1}{1\pm m/2}=1\mp m/2$$

hold to a high degree of accuracy. For this reason the relationship between the modulating voltage and the transit-time variation caused thereby is so nearly linear that the error is usually completely negligible. In any event, the waveform of the modulating voltage can be modified as required to produce the desired linear sawtooth variation of transit time. The difference between the transit times of successive bunches within the group acted upon within a single modulating cycle is a constant; hence within the group of bunches representing a single cycle of the modulating frequency the frequency is a constant. To make the total, over-all frequency a constant requires phase coherence between successive groups; i.e., the amplitude of the modulating voltage is adjusted to cause a peak-to-peak transit-time variation of one period at the desired output frequency. Phase coherence is also obtained with transit-time variations of any integral multiple $n$ of one period of the desired output frequency, in which case the power output is concentrated in the sideband $f\pm nf_m$. This is shown on the output axis 45 of Fig. 3 by the time interval between successive groups of dots being twice the interval between the dots within the group.

It will be noted that the time interval between successive electron bunches shown as dots along input axis 43 is $t_1$, wherein the time interval between successive electron bunches represented by dots on output axis 45 is a shorter time, $t_2$. The frequency, accordingly, has been increased from $$\frac{1}{t_1} \text{ to } \frac{1}{t_2}$$

and Fig. 3 illustrates that this increase in frequency is equal to the frequency of the sawtooth modulating wave.

The power output, it will be noted, is virtually undiminished from the unmodulated power output, since there is material output only at the translated frequency, $$\frac{1}{t_2}$$

with a very small component at the modulating frequency. Of course, in actual practice, this condition may not be obtained, due to, for example, lack of exact phase coherence between successive groups, or for other causes. However, the power output at frequencies other than the translated frequency $$\frac{1}{t_2}$$

is very small and may be minimized by proper adjustment or disregarded entirely in many applications.

Figure 4:
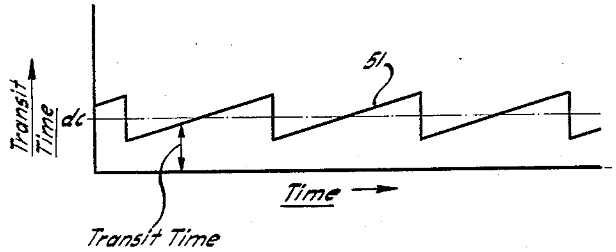
Fig. 4 is a graph of a sawtooth waveform for producing negative translation of frequencies.

Negative translation of frequency may be obtained by modulating with a sawtooth waveform of the shape shown in Fig. 4. If the curve of Fig. 4 is substituted for the sawtooth waveform 41 of Fig. 3 and an analogous chart of the electron bunch transit time made, it will be apparent that the interval between successive bunches has been lengthened, with a corresponding decrease in the frequency.

Figure 5:
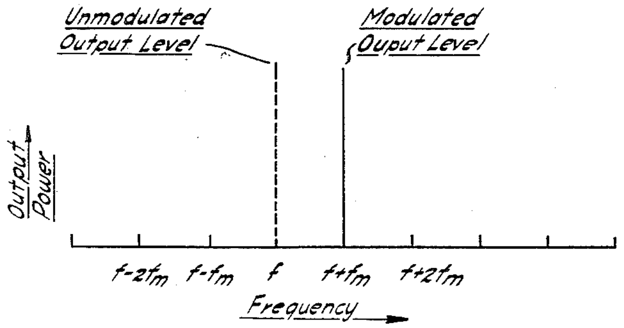
Fig. 5 is a graph showing the power spectrum of an output signal resulting from sawtooth transit-time modulation in an apparatus such as depicted in Fig. 1.

Fig. 5 depicts the power spectrum of an output signal which has been sawtooth transit-time modulated in accordance with the invention herein. Fig. 5 should be compared with Fig. 2 showing the same spectrum for a sinusoidal modulating signal. It will be noted in Fig. 5 that the modulated output level is virtually equal to the unmodulated output level, and that practically no power exists at frequencies other than the desired translated frequency $f+f_m$.

The various methods and apparatus for generating triangular or sawtooth waveforms for application to the modulating terminals, such as 21 and 23 of Fig. 1, are well known to the art. A number of such systems, for example, are described by Chance et al. in M.I.T. Radiation Lab. Series, vol. 19, chap. 7 (McGraw-Hill Book Co., New York, 1941). In applications of the invention herein such triangular wave generators may be driven by the modulating signal, whatever its waveform, to produce a sawtooth waveform of the same fundamental frequency.

It was mentioned in the description hereinabove that in order to secure exact phase coherence between successive groups of electron bunches, a particular value of amplitude of modulating sawtooth voltage is necessary, and that this amplitude may be varied to compensate for the return time of the triangular waveform where necessary or desirable. As the frequency of the output signal is varied, either by varying the frequency of the input signal or of the modulating signal, it may be necessary to vary the amplitude to retain such phase coherence. For moderate frequency deviations at the output terminal, or for particular uses, no correction for this effect may be necessary.

While the invention has been described and illustrated as applied through a klystron tube, it should be apparent that the same analysis applies to tubes of the traveling-wave type. In both of these devices the velocity at which a particular disturbance travels through the tube is a constant throughout its travel, the value of the constant being determined by the instantaneous velocity of the electron beam entering a drift space or wave guide, at the instant said disturbance is being applied to said beam. It is this disturbance velocity that is varied by the modulation; it is a constant for a particular disturbance determined once and for all by the instantaneous voltage between the cathode and the wave guide or klystron drift-space, as the case may be. Deviations of groups of electrons from the average cause the bunching that gives these tubes their amplifying properties, accentuating the amplitudes of the disturbances initially imposed upon the beam, but the disturbance itself, represented by a position of maximum or minimum electron density of the beam, travels through the device at constant velocity.

Tubes of this general character are therefore to be clearly distinguished from devices wherein moving charge-carriers transporting the disturbances fall through an accelerating field throughout their transit. In this latter type of device the velocity of the charge-carriers (and therefore, reciprocally, their transit-time), is a function of the accelerating voltage to which they are subjected integrated over the entire time of transit, instead of the instantaneous voltage across a narrow gap. For very low modulating frequencies the difference may be immaterial but for modulating frequencies at which the period even begins to approach the transit time the method falls down.

A somewhat related fact in connection with transit-time modulation is that the variation in transit-time must be equal to an integral number of periods of the output frequency, not of the carrier frequency.

The invention is particularly applicable to operation in the microwave range. With carrier frequencies of kilomegacycles, to step the frequency down to megacycles would involve changes of transit times of thousands of periods of the carrier. With devices of the constant-drift-velocity type there is no theoretical limitation on the frequency-translation that is possible, although of course there are practical limitations imposed by feasible size. The most obvious field of application of the invention is to accomplish moderate frequency shifts of microwave signals as, for example, in radio-relay installations. In such applications the approximations involved in the assumption that linear sawtooth modulation of the accelerating voltage produces linear variation in transit time result in such minor distortion and power loss that these effects can be wholly neglected. Normal departures from exact linearity in the sawtooth modulating waveforms are similarly negligible. For wider frequency shifts the shape of the modulating waves can be modified by well-known expedients to reduce the magnitude of the approximations involved, in which case the modulating waveform is still essentially sawtooth, although the slope departs slightly from linearity.

It is apparent that the method of the invention may be used with any device capable of producing a time delay variation during modulation of one period or more of the desired output frequency. It will be appreciated, accordingly, that the invention is not to be limited by the particular examples given hereinabove, but is to be limited only by the following claims.

What is claimed is:

1. In the operation of apparatus wherein a finite transit time elapses between the application of a signal to the input and the emergence of a corresponding signal from the output thereof and wherein said transit time is a function of a voltage applied to said apparatus, the method of translating the frequency of a signal applied to said input which comprises the steps of applying a direct voltage to said apparatus to establish a mean transit time of signals therethrough, generating locally an electrical wave of sawtooth waveform at a fundamental frequency numerically equal to a sub-multiple of the desired change in frequency, and applying said wave to said apparatus in addition to said direct voltage and at an amplitude relative to said voltage such as to produce a peak-to-peak variation of the transit time of said signal that is one period only of the desired translated frequency during each cycle of said electrical wave, thereby producing said translated frequency.

2. In the operation of translating apparatus wherethrough signals are propagated as variations in the intensity of an electron beam, the method of shifting the frequency of signals applied to said apparatus which comprises the steps of accelerating said beam to a constant average velocity to establish a mean propagation time of signals therethrough, applying the signals the frequency whereof is to be shifted to vary the intensity of said beam and cyclically varying the velocity of said beam substantially linearly at a rate numerically equal to the desired shift in frequency and by an amount to produce a substantially linear peak-to-peak variation in the time of propagation of signals through said apparatus in each cycle of said variation equal to one period only of the desired output frequency.

3. The method of frequency-shifting electrical signals which comprises the steps of developing a beam of electrons, applying a voltage to accelerate said beam to a constant average velocity, applying said signals to the accelerated beam at a point adjacent to the source thereof to cause a bunching of the electrons of said beam, abstracting from said beam at a position spaced from said point oscillations caused by variations in the energy thereof due to the bunching of electrons therein, generating a voltage wave of sawtooth waveform and having a fundamental frequency which is a sub-multiple of the desired shift in frequency, and adding the voltage of said wave to said constant voltage at an amplitude such as to produce a peak-to-peak variation in the transit-time of the electron bunches of said beam between the point of application of said signals and the position of abstracting energy therefrom which variation is equal to one period only of the desired output frequency.

4. The method of frequency conversion which comprises the steps of developing a beam of electrons, applying a constant voltage to accelerate said beam into a drift-space wherein the average velocity of the electrons comprising said beam remains unchanged, applying a signal the frequency whereof is to be converted to said beam to produce a bunching of the constituent electrons at the end of said drift-space, developing a periodic voltage wave of sawtooth waveform at a fundamental frequency numerically equal to a sub-multiple of the difference in frequency between the signal to be converted and the desired output signal, applying said voltage wave in addition to said constant voltage to vary the acceleration of said beam into said drift-space and at an amplitude such as to vary the transit-time of electrons therethrough in each cycle of said voltage wave by a total amount equal to one period only of the desired output signal frequency, and abstracting signal energy from said beam adjacent the end of said drift-space.

5. The method as defined in claim 4 wherein said voltage wave is applied to increase the acceleration of said beam progressively during substantially the entire cycle thereof to decrease the transit time of electrons therethrough in each cycle of said voltage wave by a total amount equal to one period only of the desired output signal frequency.

6. The method as defined in claim 4 wherein said voltage wave is applied progressively to decrease the acceleration of said beam into said drift space during substantially the entire cycle thereof so as to increase the transit time of electrons therethrough in each cycle of said voltage waves by a total amount equal to one period only of the desired output signal frequency.

References Cited in the file of this patent

UNITED STATES PATENTS

| | | |
|---|---|---|
| 2,239,677 | Jobst | Apr. 29, 1941 |
| 2,401,945 | Linder | June 11, 1946 |
| 2,508,645 | Linder | May 23, 1950 |